UNITED STATES PATENT OFFICE.

OSCAR DRESSEL, OF ELBERFELD, AND RICHARD KOTHE AND HEINRICH HOERLEIN, OF VOHWINKEL, GERMANY, ASSIGNORS TO FARBENFABRIKEN VORM. FRIEDR. BAYER & CO., OF ELBERFELD, GERMANY, A CORPORATION OF GERMANY.

DYE.

989,954. Specification of Letters Patent. Patented Apr. 18, 1911.

No Drawing. Application filed October 21, 1910. Serial No. 588,350.

*To all whom it may concern:*

Be it known that we, OSCAR DRESSEL, RICHARD KOTHE, and HEINRICH HOERLEIN, doctors of philosophy, chemists, citizens of the German Empire, residing, respectively, at Elberfeld, Vohwinkel, and Vohwinkel, near Elberfeld, Kingdom of Prussia, Germany, have invented a new Dye, of which the following is a specification.

Our invention relates to the manufacture and production of new azo dyestuffs suitable for dyeing wool which are obtained by combining the diazo compounds of aminoarylsulfonamids with naphthol sulfonic acids. The new dyestuffs are after being dried and pulverized in the shape of their alkaline salts from orange to reddish-brown powders soluble in water and in concentrated sulfuric acid with from an orange to red color; yielding upon reduction with stannous chlorid and hydrochloric acid an aminoarylsulfonamid and an aminonaphthol sulfonic acid. They dye wool from orange to red shades which are remarkable for their excellent fastness to milling, washing and light.

In order to illustrate the new process more fully the following example is given, the parts being by weight:—26.2 parts of 4-toluidin-2-sulfonanilid:

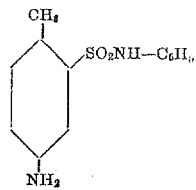

are diazotized with 30 parts of HCl (19° Bé.) and 6.9 parts of sodium nitrite. The diazo compound is then added to an aqueous solution, containing an excess of sodium carbonate of 25 parts, of the sodium salt of 2-naphthol-6-sulfonic acid. After the combination is complete common salt is added and the new coloring matter is filtered off. It is after being dried and pulverized in the shape of its sodium salt a red powder, soluble in water and in concentrated sulfuric acid with an orange color. It dyes wool from acid baths brilliant orange even shades fast to light and to milling. Upon treatment with stannous chlorid and hydrochloric acid it is split up, a toluidin-2-sulfonanilid and 1-amino-2-naphthol-6-sulfonic acid being obtained.

The process is carried out in an analogous manner on using other sulfonamids e. g. ortho-anisidin-para-sulfonanilid $$(C_6H_3OCH_3 : NH_2 : SO_2.NH.C_6H_5 — 1:2:4),$$

ortho-toluidin-para-sulfontoluidid $$(C_6H_3CH_3 : NH_2 : SO_2.NH.C_6H_4.CH_3),$$
$$\quad 1 \quad\; 2 \quad\quad 1^1 \quad\quad 4^1$$

ortho-chloro-anilin-para-sulfon-xylidid:

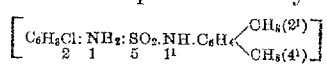

4-toluidin-2-sulfonyl-1-naphthylamin-4- or 5-sulfonic acid, 4-toluidin-2-sulfonyl-para-sulfanilic acid, 4-toluidin-2-sulfonyl-meta-sulfanilic acid; the 2-naphthol-6-sulfonic acid can be replaced by other naphthol sulfonic acids, *e. g.* 1-naphthol-4- or 5-sulfonic acid, 2-naphthol-3.6-disulfonic acid, etc.

We claim:—

1. The herein described new dyestuffs obtainable by reacting upon naphthol sulfonic acids with diazotized aminoarylsulfonamids, which dyes are after being dried and pulverized in the shape of their alkaline salts from orange to reddish-brown powders soluble in water and in concentrated sulfuric acid with from an orange to red color; yielding upon treatment with stannous chlorid and hydrochloric acid an aminoarylsulfonamid and an amino-naphthol sulfonic acid and dyeing wool from acid baths from orange to red shades, substantially as described.

2. The herein described new dyestuff obtainable by reacting upon 2-naphthol-6-sulfonic acid with diazotized 4-toluidin-2-sulfonanilid, which is after being dried and pulverized in the shape of its sodium salt a red powder soluble in water and in concentrated sulfuric acid with an orange color; yielding upon reduction with stannous chlorid and hydrochloric acid 4-toluidin-2-sulfonanilid and 1-amino-2-naphthol-6-sulfonic acid and dyeing wool from acid baths brilliant orange shades, substantially as described.

In testimony whereof we have hereunto set our hands in the presence of two subscribing witnesses.

OSCAR DRESSEL. [L. S.]
RICHARD KOTHE. [L. S.]
HEINRICH HOERLEIN. [L. S.]

Witnesses:
  CHAS. J. WRIGHT,
  ALFRED HENKEL.